(12) United States Patent
MacKellar

(10) Patent No.: US 6,258,150 B1
(45) Date of Patent: Jul. 10, 2001

(54) PROCESS FOR THE BENEFICIATION OF WASTE MATERIAL AND THE PRODUCT DEVELOPED THEREFROM

(76) Inventor: William James MacKellar, 8308 Manchester, Grosse Ile, MI (US) 48138

(*) Notice: Subject to any disclaimer, the term of this patent is extended or adjusted under 35 U.S.C. 154(b) by 0 days.

(21) Appl. No.: 09/046,973

(22) Filed: Mar. 24, 1998

(51) Int. Cl.[7] .................................................. C22B 1/00
(52) U.S. Cl. .......................... 75/749; 75/319; 75/750; 209/3; 209/11; 241/14; 241/24.1; 241/24.25; 423/153; 423/154
(58) Field of Search ........................... 75/319, 749, 750; 423/153, 154; 209/3, 11; 241/14, 24.1, 24.25

(56) References Cited

U.S. PATENT DOCUMENTS

| | | | |
|---|---|---|---|
| 3,081,954 | * 3/1963 | Heckett | 241/14 |
| 3,330,644 | * 7/1967 | Haussig | 75/750 |
| 4,666,591 | 5/1987 | Imai et al. | 209/38 |

* cited by examiner

Primary Examiner—Ngoclan Mai

(74) Attorney, Agent, or Firm—Malloy & Malloy, P.A.

(57) ABSTRACT

An iron based product having at least a sufficient total ferrous content by weight to render the product commercially feasible wherein the product is derived by a process comprising the beneficiation of kish slag waste material having a relatively low ferrous material content before beneficiation. The resulting iron based product has a total ferrous content of substantially 90% by weight thereby making it both practical and economical for the reintroduction into iron and/or steel making processes utilizing an injection method or by briquetting at at least a portion of the resulting product. The beneficiation process involves the heating of the waste material to an extent at least sufficient for drying, separating the high sulphur slag from a remainder of the waste material and subsequently classifying the remainder of the waste material, once separated from the high sulphur slag by particle size. The classified, substantially larger particle size waste material is then ground until a predetermined range of particle sizes are present and until the general particle size of secondary material products with little or no ferrous content are reduced below the general particle size of the remaining primary iron based product which do not readily reduce in size under the grinding. Subsequently, the particles are again classified so as to remove and collect the primary iron based product particles that remain above a predetermined mesh size from the processed waste material.

20 Claims, 3 Drawing Sheets

PROCESS FOR THE BENEFICIATION OF WASTE MATERIAL AND THE PRODUCT DEVELOPED THEREFROM

BACKGROUND OF THE INVENTION

1. Field of the Invention

This invention relates to a process for the beneficiation of maximum amounts of kish slag waste material for the purpose of deriving an iron based product sufficient in total ferrous content to be reusable in a variety of forms in a plurality of industrial processes in the iron and/or steel producing industry, while also producing a viable by-product with minimal ferrous content.

2. Description of the Prior Art

Desulf slag or kish slag which contains very low iron content is a waste material by-product of the steel and iron producing industry which, in the form accumulated, is generally considered to be impractical for purposes of reuse in conventional processes associated with the industry. One exception to this is the possible use of this low iron content material as an additive to sinter plants. In addition to the low iron content in the form that kish slag is produced, it also comprises particles or fines of extremely small size. Accordingly, the combination of low iron content and extremely small sizing of the particles or fines eliminates its use as a practical addition to processes in the steel or iron making industry.

As a result, steel mills accumulate extremely large quantities of this waste material resulting in problems related to the disposal of such waste material in a manner which is both economical and which complies with environmental restrictions of a given geographical area. For example, an area such as Detroit, Michigan can easily produce desulf slag or kish slag in quantities approximating 7,000 tons per month. The relatively small amount of such material which is capable for use as a low iron addition to sinter plants still leaves significant quantities of such waste material which eventually must be disposed of on a periodic basis.

Because of the large quantities of waste material produced by the iron and steel industries, attempts have been made to re-use iron containing waste products, which are generally considered to be uneconomical, by further treating or processing for the purpose of commercialization. Related art attempts have been made to develop methods which minimize the reprocessing procedures of waste material and which use "as-is" materials obtained directly from the mill. The returning of such products to the internal yield of the steel or iron producing mill, however, have generally been considered to be unsuccessful. These attempts include taking such "as-is" iron oxides and briquetting such materials in combination with other more iron rich products for use as commercial additions having sufficient iron content. Furthermore, the particle size is no longer an issue after briquetting has been accomplished. Usually low iron oxide containing materials as an addition to existing or conventional industrial processes has also been attempted by way of utilizing an injection process.

In light of the generally unsuccessful attempts to reuse waste material and the well recognized continuous accumulation at virtually every steel mill utilizing conventional processes, huge quantities of slag and gangue waste material continue to accumulate. Debate in the treatment of such waste material and proposed methods of disposition thereof continue without any satisfactory solution. The waste material, of the type set forth above and common to most steel mills contain an iron content of from about 30% to almost 50%. In spite of this significant iron content, the accumulated waste material, in its present form continues to be sufficiently contaminated with slag, kish, sulphur, etc. and based on the aforementioned size of the resulting fines or particles, the ability to recharge blast furnaces, as an example, is not commercially feasible. Therefore, such waste material is well recognized as having little commercial value or even a negative value when considering the cost of disposable.

Based on the above, there is a recognized need in the steel industry for a process which is both practical and economically feasible and directed to the beneficiation of desulf or kish slag waste material. Such waste material should have an iron content such that the primary product or material derived from a preferred beneficiation process would have sufficient iron content preferably in the range of substantially 90%. In addition sufficient yield from the processing of the waste material of substantially a 30% to 40% average would make commercialization of a preferred beneficiation process as well as the resulting material, feasible. For example, existing systems and methods of beneficiation generally have very limited benefits, and are only available for use with waste material containing relatively high quantities (50% or more) of iron content, all waste containing less than 50% iron necessarily being discarded before processing even commences. Moreover, in addition to discarding the low iron content waste materials before processing, such existing beneficiation methods actually produce waste material with quantities of iron in what the present invention makes a useable range. Moreover, the waste material produced by other products is not only of such an iron content as to waste a good deal of iron product, but is also of too high of an iron content for the final waste material to be potentially useable in other by-products. Specifically, such existing methods utilize common magnetic separation techniques, achieving only a preliminary separation of low iron content waste from high iron content material which is sufficient to allow the magnetic separation to effectively act upon the useable product. As a result, it would be beneficial to provide a beneficiation system and method which truly maximizes the amount of iron contained in waste material that is actually made available for use, while also maintaining the final waste product at a relatively low iron content so as to potentially increase its useability. Furthermore, such a beneficiation system should not merely "loosen" high iron content product from low iron content waste, but should be structured to more completely and effectively eliminate and/or separate the iron itself from other waste, thereby effectively utilizing a majority of the iron within the waste material rather than the higher concentrations that are easier to separate.

SUMMARY OF THE INVENTION

The present invention relates to a process for the beneficiation of waste material comprising kish slag. Kish slag is a by-product of the steel industry having relatively small size particles and a low initial iron content of generally between 30% and 50%.

Further, the present invention is directed towards a reusable, commercially viable iron based product derived from the preferred beneficiation process of the present invention which has a total ferrous content of substantially at least 90% by weight, and preferably in the range of 88% to 92%. The beneficiation process as described hereinafter in a preferred embodiment of the present invention, upgrades the original waste material from an iron content of approximately 30% to 50% by weight to approximately 90% by weight. The resulting primary material product can then demand a sufficiently high price on the commercial market to compete with other additive materials or products, such as HBI, DRI, CBI, and others. Further, the resulting primary material iron product of a preferred embodiment of the present invention and derived from the subject beneficiation process has an acceptably low sulphur content, preferably in the range of 0.025% to 0.035% by weight. The resulting iron product can be used in steel making facilities as scrap replacement in that the remaining sulphur content is as low or lower than the content of the original iron product out of the blast furnace.

More particularly, the subject beneficiation process of the preferred embodiment involves heating the collected waste material comprising the kish slag at least to a sufficient degree to accomplish drying. Alternately, and/or additionally, heating may continue to occur to a sufficient extent and duration so as to further remove volatile components such as but not limited to hydrocarbons from the waste material. The waste material is then further processed for the purpose of separating the high sulphur slag component of the kish slag from a remainder of the waste material defined by ferrous metal and ferrous oxide. The sulphur content of the remainder of the waste material in the final iron product is preferably between 0.025% and 0.035% by weight.

Subsequently, the remaining waste material is classified for purposes of removing the previously separated high sulphur slag from the waste material and further transferring the remaining waste material to a grinding or like facility for purposes of further reducing the particle size until such a point as the remaining portions of the high sulfur slag can be readily separated out. Subsequent to the sufficient separating and grinding being achieved, the ground waste material is classified by particle size wherein the significantly larger particles, of a predetermined mesh size, are removed from waste material having a particle size lesser than substantially a predetermined mesh size. The larger particles are collected and serve to define the primary material product having a ferrous content substantially at least in the range of 90% by weight.

As a result of the subject beneficiation process as set forth above, the material is ground to a point where a secondary material product is also derived at the point where the second classification occurs, immediately subsequent to grinding. Moreover, and as further described with regard to the preferred embodiment of the present invention, the material is ground sufficiently that particles having a size less than a predetermined mesh size can be separated out and specifically removed from the larger sized particles. The particles of lesser mesh size may be used for secondary industrial purposes not necessarily related to the steel or iron producing industry. Such commercial applications may include additives for cement aggregate, agricultural additives, etc. However, even in the event that the secondary material product becomes impractical or uneconomical from a commercial stand point, the subject beneficiation process results in a yield of approximately a 40% average of what was previously considered to be almost total waste. The resulting primary material iron product has a particle size averaging approximately 28 mesh or larger, and the particles of a lesser mesh size have such a low iron content that other ultimate uses which require very low ferrous contents may be explored.

Based on the above, it is a primary object of the present invention to produce an iron product having a high purity ferrous content in an acceptable percentage by weight to render the product commercially feasible as an iron additive for iron and steel producing processes, wherein the product is derived by a process for the beneficiation of kish slag waste material.

Another primary object of the present invention is to produce a high purity iron product having substantially 90% by weight of total ferrous content derived from a process for the beneficiation of kish slag waste material.

Another important object of the present invention is the production of a high purity iron product of a predetermined, and sufficient total ferrous content by weight wherein the resulting primary iron product defines at least approximately 30% and preferably exceeding an average 40% yield from the original waste material.

Still another important object of the present invention is to develop a process for the beneficiation of large quantities of desulf or kish slag waste material which is practical and economical to the extent of producing a primary material iron product having a sufficient iron content and at a cost which is economically feasible for resale and reuse.

It is also an important object of the present invention to produce a high purity iron product which is derived from a process for the beneficiation of kish slag waste material and further deriving a secondary material by-product of somewhat lower total ferrous content suitable for reuse in non-iron and steel producing industries.

A further important object of the present invention to produce a high purity iron product through the effective beneficiation of kish slag waste material having an iron content as low as 30% so as to dramatically increase the amounts of waste material that can ultimately be utilized in the beneficiation process, and which derives a secondary material by-product of a substantially low total ferrous content so as to minimize ferrous waste and make the by-product suitable for reuse in non-iron and steel producing industries which may require very low ferrous contents.

These and other objects, features and advantages will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed towards a process for the beneficiation of kish slag, and especially including kish slag having a ferrous content of between 30% and 50% by weight that was previously thought to be unusable in a beneficiation process, which results as a waste product from conventional processes used in the iron and steel making industry, so as to produce a high iron purity iron product as described in a preferred embodiment of the present invention.

Previous attempts in the steel and iron producing industry have been made for the reusing of "as-is" oxides generated from the mill by returning these oxides to the internal yield of the mill primarily after treating such oxides by agglomeration or briquetting. None of these known methods used or incorporated the beneficiation of waste materials having relatively low ferrous contents by weight to produce an iron rich product of significantly higher value and a low iron content by-product.

Currently, there exists in every steel and iron producing mill, significant quantities of slag and gangue material. Debate continues over the efficient disposition of such waste material. It is important to note that the iron content of such waste material such as kish slag, common to most steel mills, ranges from at least approximately 30% to 50% by weight. However, in its present form the resulting waste material from conventional processes associated with the iron and steel producing industry is contaminated with slag, kish, sulphur, etc. and in addition, is sized too small to recharge into a blast furnace on an "as-is" basis. As a result, the accumulation of waste material continues as an ever present problem.

Figure 3:
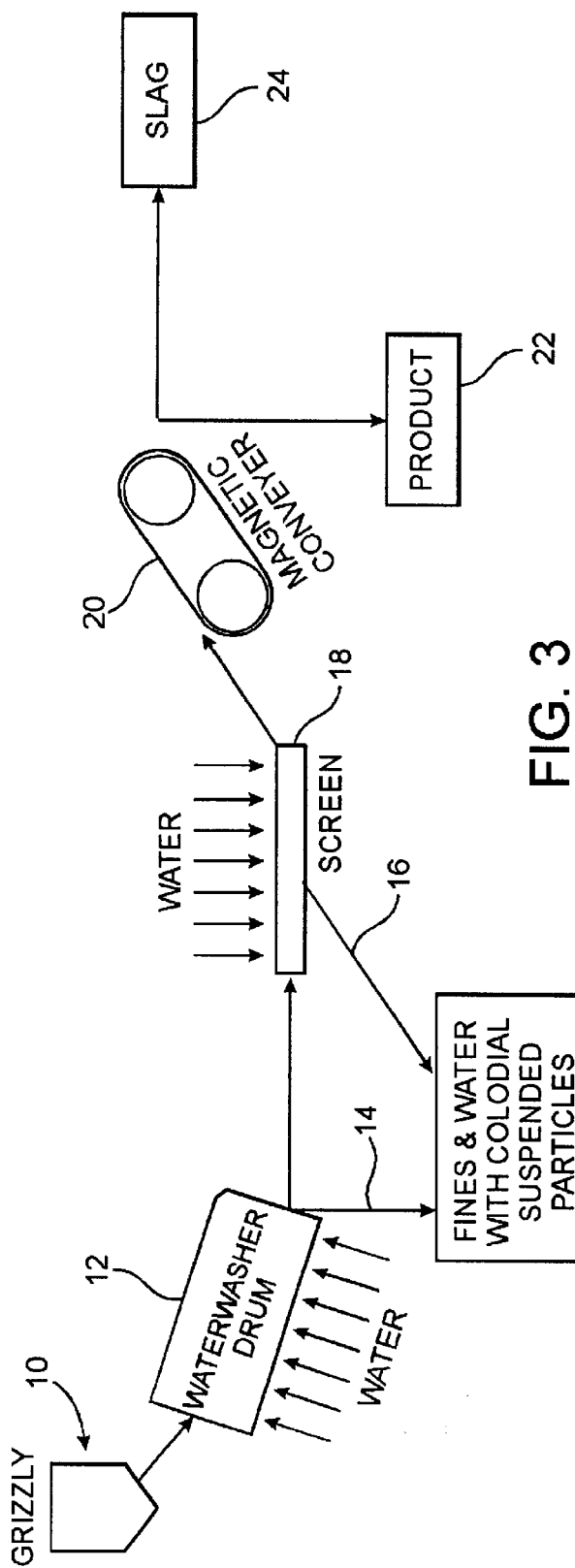
FIG. 3 is another embodiment of a preliminary trial process in the development of the beneficiation process of the preferred embodiment.

In order to utilize or "recycle" waste material of the type set forth above, a beneficiation process for maximum amounts of kish slag waste material was developed. With reference to FIG. 3, a beneficiation process utilizing hydrometallurgy was first developed wherein the collected waste material was introduced as at 10 and subsequently directed to a water washing or rinsing facility as at 12. Fines carried with the rinse water resulted in a colloidal suspension of particles which was delivered or settled into settling ponds generally indicated as 14. The larger particles, not carried away with the rinse water were classified as by screening concurrently to an additional water rinse. The larger particles were carried onto a conveyor for transporting and magnetically separating the higher iron content product. The water was previously removed therefrom along with the additional fines as at 16. The fines removed as part of the rinse water associated with the screening type classification is also generally indicated 16. The screening facilities used for classification is generally indicated as 18.

A conveyor 20, preferably of the magnetic type was then utilized to transport the larger particles subsequent to classification by screening facilities 18 to a local where a primary material product as at 22 was removed from the slag or gangue material, as at 24, which is designated as unusable. Utilizing this initial process as outlined in FIG. 3, the initial kish slag fines were upgraded from approximately 45% total iron content by weight to almost 80% iron content by weight. However, it has been determined that in order to have a commercially successful product, the iron content of the primary material product being produced has to have an iron content of substantially 90% by weight, and preferably in the range of 88% to 92% although consumer demand may vary the requirement to below that range. In particular, at such high purity, iron content levels the resulting primary material product can be competitive on a commercial basis with other iron additive products such as but not limited to "HBI", "DRI", "CBI", and other materials.

Figure 4:
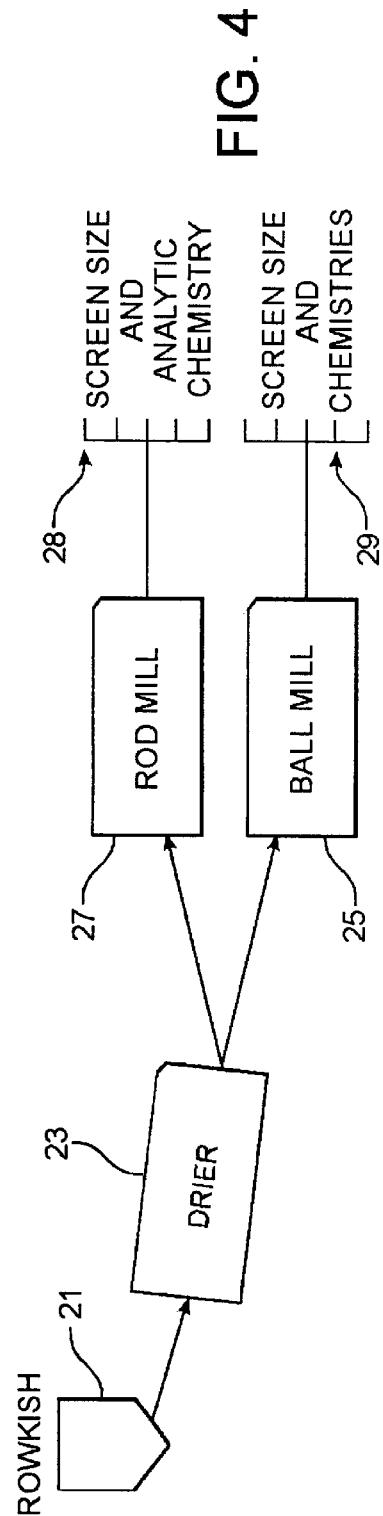
FIG. 4 is a schematic representation of a pilot plant study utilized in the development of the subject preferred embodiment of the beneficiation process of the present invention.

In order to expand and further develop the hypothesis of perfecting a beneficiation process for kish slag waste material, further experimentation was conducted and was seen to confirm the basic assumption of the effectiveness and economic feasibility of the beneficiation of kish slag waste material by proving that a high purity iron content product having a total ferrous content of about 90% or more, by weight, with a yield of at least approximately 49% is possible. The result was a pilot plant study, schematically represented in FIG. 4, wherein the empirical results of the investigation indicated that the subject beneficiation process was worthy of commercial development. In the investigatory procedure, the raw material sample of waste material 21 was dried as at 23. Subsequently, the sample was run through a ball mill 25 and/or rod mill 27 with a retention time of one hour. The purpose of such "primary crushing" was to initially separate the high sulphur slag from the remainder of the waste material. However, it was determined that in addition to separation of the products, the high sulfur slag which did not contain significant amounts of ferrous material were more readily crushed and reduced in size than the remainder of the waste material when increased and/or continued amounts of the crushing pressure were applied. As a result, the product of the ball/rod mill was classified by size and as by screening as at 28 and 29 into seven particle size factions of +20 mesh, +28 mesh, +35 mesh, +48 mesh, +65 mesh, +100 mesh and −100 mesh. Indeed, the system of the present invention functions such that screening, which was previously only employed in a very cursory manner, at early processing stages, and with very large particles, is able to be utilized in a unique manner that actually effectuates the very precise and effective beneficiation of larger percentages of the ferrous material content of previously discarded kish slag.

Each mesh size was tested and weighed and data was collected indicating the information set forth in Table I below. Analytical analysis was performed on the top three mesh sizes, four mesh sizes and five mesh sizes. To perform this analysis the factions were combined and re-crushed to a particle size of +65 mesh and −65 mesh. For example, the +20, +28 and +35 mesh size materials were accumulated, re-crushed and re-sized a 65 mesh screen. The results are set forth immediately hereinafter;

TABLE I

| Size | Metallic Fe | Total Fe | % of Sample | % of Original |
| --- | --- | --- | --- | --- |
| +65 | 100 | 100 | 53.24 | 17.57 |
| −65 | 77.31 | 91.40 | 46.76 | 15.43 |

The above procedure accounted for approximately ⅔ of the total iron available in the raw waste material. The issue to be subsequently resolved was the problem of extracting the remaining ⅓ iron while increasing the material yield. As a result, a series of tests were evaluated wherein different separation processes were utilized. As a result, a process was successfully identified as generally and schematically represented in FIG. 5.

Figure 5:
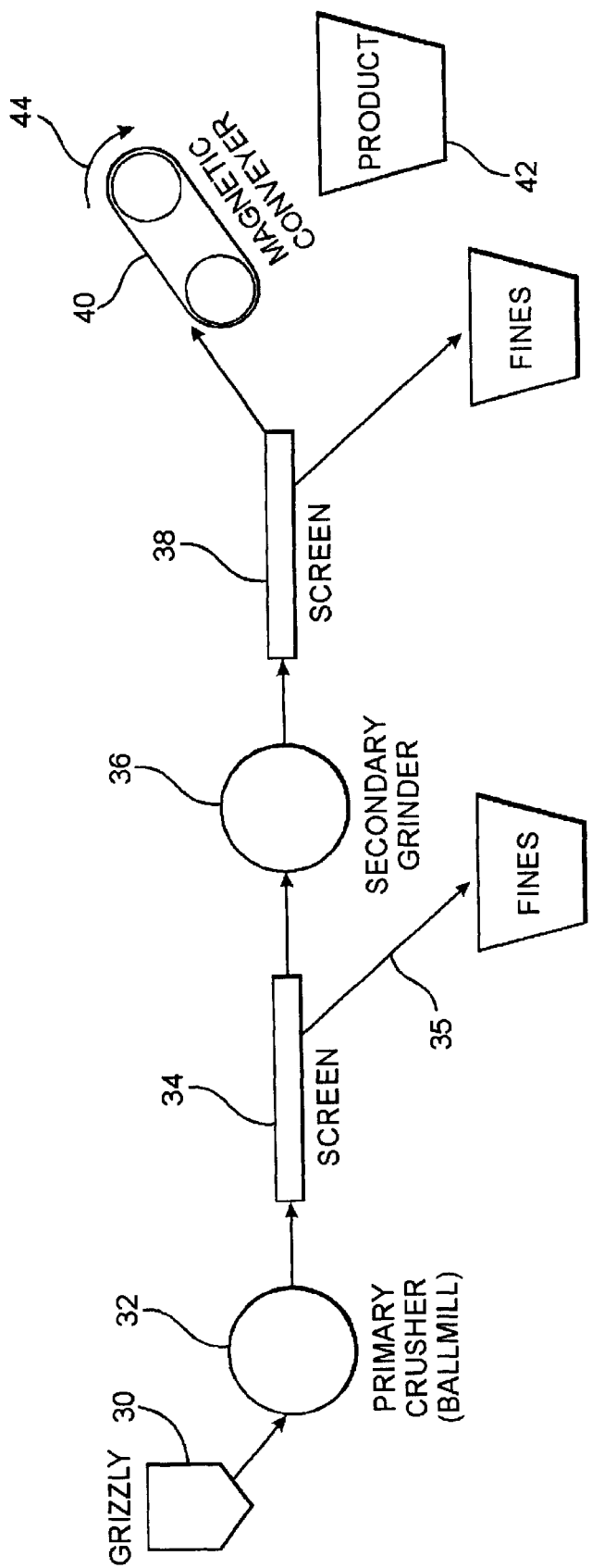
FIG. 5 is a further developmental embodiment of the subject beneficiation process in schematic form.

With reference to FIG. 5, collected raw material in the form of the aforementioned kish slag waste material 30 was fed to a primary crushing facility and/or ball mill 32 for purposes of separating out the high sulphur content slag from a remainder of the crushed waste material. This crushed material including separated high sulphur slag was transferred to a screening facility as at 34 for purposes of classifying by particle size. The smaller fines were discarded as at 35 thereby deleting a certain percentage of the high sulphur slag. The larger particles were transferred to a secondary grinder for further grinding until separation and particle size reduction of significant remaining portions of the high sulphur slag as at 36 was achieved. Subsequently, a second classification was accomplished by screening facility 38 wherein the smaller particle size fines were removed. The remaining product, more specifically defined as the primary material and having a high iron purity, was conveyed away from the classifying step as at 38 by means of a conveyor 40, preferably of the magnetic type. Additional slag was removed at 44 and the final iron product was removed and collected as at 42 from the conveyor 40.

Figure 1:
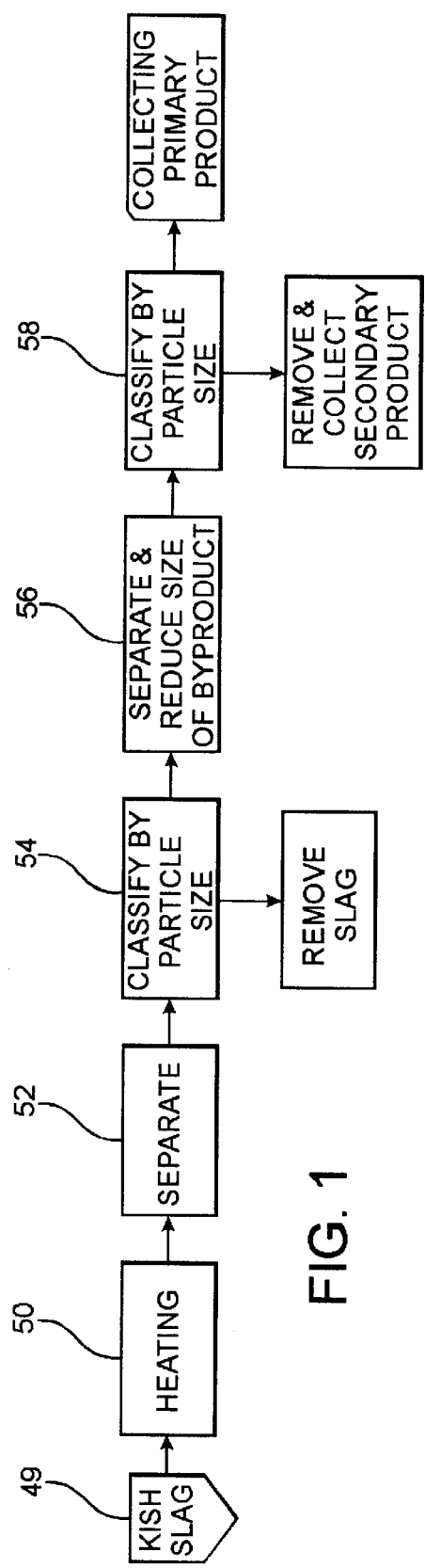
FIG. 1 is a block diagram of the basic steps of the preferred embodiment of the benef iciation process of the subject invention.
Figure 2:
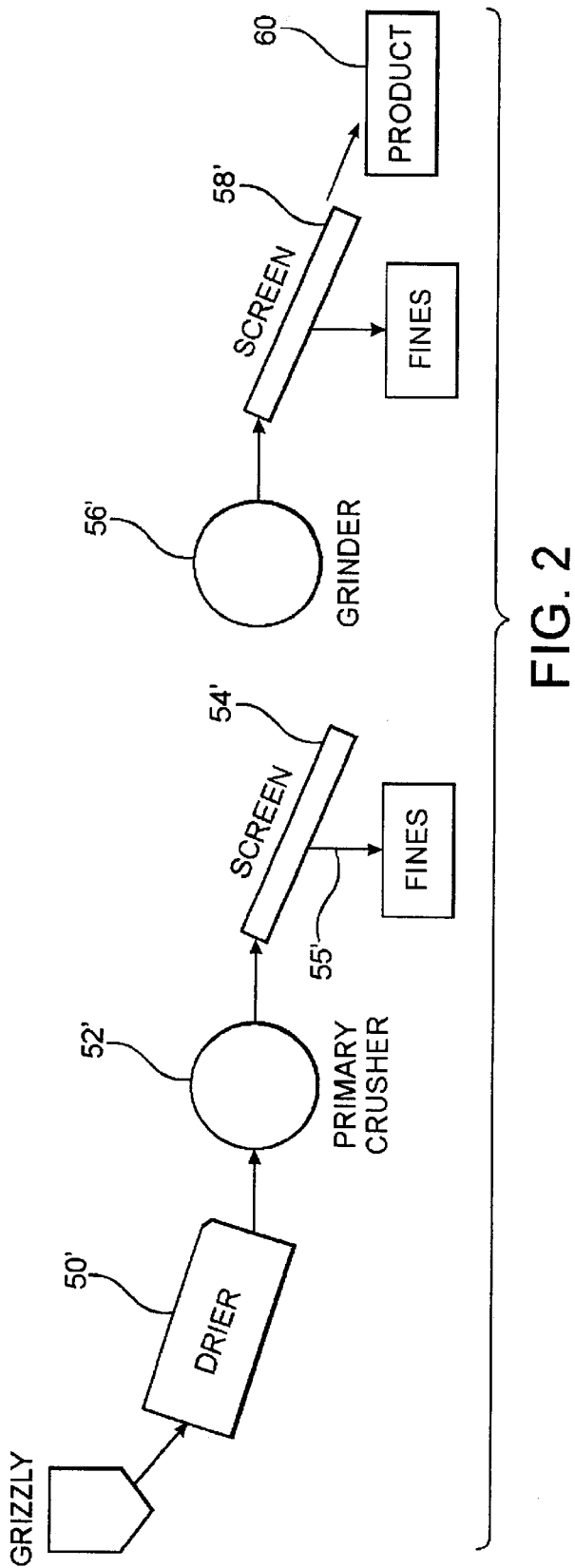
FIG. 2 is a schematic view of the plurality of processing steps contained in the preferred embodiment of the beneficiation process of FIG. 1.

One embodiment of the present invention is disclosed in the dry beneficiation process of FIG. 5, as well as the beneficiation process of the preferred embodiment more specifically disclosed in FIGS. 1 and 2. Classification by particle size may be accomplished for purposes of separating particle fines of a lesser predetermined size from those of larger predetermined size. In the preferred embodiment such classification is done by screening as shown and described. However, an additional process for the classification of particulate material by particle size exists and was developed by Michigan Technological University (MTU). Accordingly, the MTU classification process represented herein as "air classification" could be incorporated in either or both of the classification steps of the processes of FIGS. 2 and 5 wherein the preferred embodiment of FIG. 2 is described as conducting such classification steps by screening.

With reference to FIGS. 1 and 2, the preferred embodiment of the process for the beneficiation of kish slag waste material is disclosed wherein FIG. 1 represents the broad process steps and a FIG. 2 represents a preferred embodiment of process steps.

The result of the preferred beneficiation process as shown in FIGS. 1 and 2 is the production of a primary material product having a high purity iron or ferrous content in the range of 90% or more by weight, while in turn producing a by-product with such a relatively low ferrous content that it may have increased useability or disposeability. With reference to FIG. 1, the waste material is collected as at 49 and transferred to a heating facility generally indicated as 50. There, the waste material is heated at least to the extent of drying the waste material for the removal of a majority of water therefrom. In addition, the heat applied at the facility 50 may be extended both in degree and duration sufficient to remove volatile compounds or materials such as but not limited to hydrocarbons. The heated material is subsequently transferred to a separating facility indicated in FIG. 1 as 52 and represented by a primary crushing facility or bar/rod mill 52' in FIG. 2. The crushing of the kish slag waste material at this point serves to separate the high sulphur slag from a remainder of the waste material primarily comprising metallic and oxide iron. Accordingly, after further separation as at 56 and 56', significant remaining portions of the high sulphur slag are separated out by further reducing the particle size. Again with reference to both FIGS. 1 and 2 subsequent to the initial separation or primary crushing step as at 52 and 52' respectively, the crushed waste material is further classified as at 54 and 54'. In the preferred embodiment such classification by particle size may occur by screening wherein the screening facility has a predetermined mesh size such that the smaller particles represented by fines 55 are removed from the remainder of the waste material at this point.

Separation further occurs as at 56 and 56' through the use of a grinder facility 56'. Moreover, the grinder facility is preferably employed until such a time as a by-product containing lesser amounts of the ferrous material become reduced to below a predetermined particle size that is less than the particle size of the primary material which is desired and which contains the preferably 90% or more ferrous content. Specifically, the present system recognizes that through continued grinding the waste kish slag or by-product does not resist crushing as well as the primary material with the high iron content. Accordingly, as the by-product continues to reduce in particle size during continued grinding, the beneficiated primary material does not equivalently reduce in particle size. As such, after separation, removal as indicated generally at 58, is achieved wherein a secondary classification processing step occurs. In particular, because of the effectiveness of the previous steps, the fines having a particle size that is less than a predetermined mesh size, depending upon the screening or classifying facility 58', are passed through and removed from the primary material product indicated as 60. The high purity iron content product having a ferrous content of the preferably at least 90% by weight is thereby defined. As set forth above, another embodiment of the present invention comprises the steps of classifying as at 54 and 58 in FIG. 1 being conducted by the described air classifying process rather than through the use of screening facilities as at 54' and 58', however, the present invention as configured makes the screening substantially effective.

The preferred embodiment of the subject beneficiation process of kish slag waste material as represented in FIGS. 1 and 2 results in the production of two products. A first primary material product 60 has the aforementioned high purity iron content of approximately 90% by weight. Table II, set forth below represents the chemical and physical makeup of the final product clearly indicating a total ferrous content by weight of over 91% in the experiment performed.

TABLE II

| | | | Chemistry | | | | | |
|---|---|---|---|---|---|---|---|---|
| comp | Fe total | Metallic Fe | FeO | SiO$_2$ | AbO$_3$ | CaO | S | MgO |
| wt % | 91.33 | 87.33 | 8.16 | 1.49 | 0.61 | 2.07 | 0.25 | 0.57 |

| | Physical | | |
|---|---|---|---|
| mesh | +20 | +28 | +35 |
| wt % | 18.24 | 4.89 | 7.21 |

A secondary material is also produced utilizing the beneficiation process as represented in FIG. 1 wherein Table III set forth below represents its chemical makeup.

TABLE III

| Comp | FeO | CaO | SiO$_2$ |
|---|---|---|---|
| Wt % | 29.4 | 37.6 | 27.5 |

Physically, the material of the secondary material product is approximately 300 mesh particle size. Such a small particle size and a relatively low iron content may dictate that the secondary product not be effectively usable from a practical stand point in the iron and steel producing industry. Other uses which may be of economic or commercial benefit may be available and include use as an additive for cement aggregate, an agricultural additive, etc. However, even if no use can be found for the secondary material product, averaging over 40% of the original kish slag waste material is usable by the beneficiation process of the preferred embodiment as shown in FIGS. 1 and 2. Furthermore, the system of the present invention is able to remove such a great degree of the ferrous content that even further uses of the secondary material product in industries which have been yet unexplored due to the lack of useability of a by-product with as much as 30% to 50% by weight ferrous content as was previously the maximum iron extraction limit, may now be effectuated.

The primary material iron product has an average particle size of 28 mesh. This particle size, while not being effectively able to be introduced into an iron or steel making process "as-is" on a practical basis could be introduced utilizing known injection techniques. Such injection techniques would avoid the additional costs of requiring the particulate of the primary material to be agglomerated or formed into briquettes. However, even if all of the produced material from the preferred beneficiation process of the subject invention could not be reutilized through injection techniques, a product distribution of partial injection and partial briquetting would be practical, economical and commercially feasible.

If a significant portion of the resulting primary material product were briquetted, this would facilitate charging into the BOF or BAF. Carbon additives or other materials could be custom blended into briquettes for the particular need of steel making shops. Again, the formed briquette would have as its base the 90% by weight ferrous content of the primary material of the present invention with a cost well below current scrap cost. In addition, briquetting operations of the high purity iron product of the present invention could be used to "salt" the lower grade oxides of the current briquettes and produce a briquette of higher iron content thereby stabilizing blast furnace yields. Accordingly, the present invention contemplates use of the resulting high purity iron content product of the present invention as two economical and commercially viable alternatives for the utilization of steel mill waste products. Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A process for the beneficiation of kish slag waste material comprising the steps of:
   a) heating the waste material to an extent at least sufficient to accomplish drying thereof,
   b) separating high sulphur slag from a remainder of the waste material,
   c) classifying the high sulphur slag and the remainder of the waste material by particle size,
   d) removing at least a portion of the remainder of the waste material comprising a predetermined larger particle size from the high sulphur slag,
   e) grinding the removed remainder of the waste material to further reduce the particle size thereof,
   f) classifying the ground waste material by particle size, and
   g) removing and collecting at least a portion of the ground waste material having at least a predetermined larger particle size to define a primary material having a total ferrous content of substantially 90% by weight.

2. A process as in claim 1 wherein said predetermined larger particle size defining said primary material averages a particle size of substantially 28 mesh.

3. A process as in claim 1 further including heating the waste material to an extent necessary for the removal of volatile compounds.

4. A process as in claim 3 wherein the volatile compounds include hydrocarbons.

5. A process as in claim 3 comprising separating the high sulphur slag from the remainder of the waste material by crushing the waste material.

6. A process as in claim 5 comprising classifying the high sulphur slag and the waste material by screening utilizing a screen of predetermined mesh size.

7. A process as in claim 6 comprising classifying the ground waste material by particle size by screening utilizing a screen of predetermined mesh size.

8. A process as in claim 1 comprising classifying the ground waste material by particle size by screening utilizing a screen of predetermined mesh size.

9. A process for the beneficiation of kish slag waste material having a total ferrous content of at least between 30% and 50% by weight, the process comprising the steps of:
   a) heating the waste material at least to an extent to accomplish drying thereof,
   b) separating high sulphur slag from a remainder of the waste material,
   c) classifying the high sulphur slag and the remainder of the waste material by particle size and thereby removing the remainder of the waste material from the separated high sulphur slag,
   d) grinding the remainder of the waste material to obtain a predetermined particle size,
   e) subsequently classifying the ground waste material by particle size,
   f) removing and collecting the subsequently classified ground waste material having a predetermined greater particle size to define the iron product, and
   g) removing and collecting the subsequently ground waste material having a predetermined lesser particle size to define a secondary material product.

10. A process as in claim 9 further including heating the waste material to an extent necessary for the removal of volatile compounds.

11. A process as in claim 10 wherein the volatile compounds include hydrocarbons.

12. A process as in claim 9 comprising separating the high sulphur slag from the remainder of the waste material by crushing the waste material.

13. A process as in claim 12 comprising classifying the high sulphur slag and the waste material by screening utilizing a screen of predetermined mesh size.

14. A process as in claim 13 comprising classifying the ground waste material by particle size by screening utilizing a screen of predetermined mesh size.

15. A process as in claim 9 comprising classifying the ground waste material by particle size by screening utilizing a screen of predetermined mesh size.

16. A process as in claim 9 wherein the secondary material product has a significantly lesser iron content than the iron product.

17. A process as in claim 16 wherein the secondary material product has an average particle size of substantially three hundred mesh.

18. A process as in claim 9 wherein the iron product comprises an average yield from the kish slag waste material of approximately 30% to at least 40%.

19. A process for the beneficiation of kish slag waste material comprising the steps of:

a) heating the waste material having an initial ferrous content of between 30% and 50% by weight to an extent at least sufficient to accomplish drying thereof, b) crushing said waste material until a substantial amount of high sulphur slag is separated from a remainder of the waste material, c) classifying the high sulphur slag and the remainder of the waste material by particle size, d) removing at least a portion of the remainder of the waste material comprising a predetermined larger particle size from the high sulphur slag, e) grinding the removed remainder of the waste material so as to generally reduce a particle size thereof and to separate a primary material having a total ferrous content of substantially 90% by weight from a by-product of the waste material which has a substantially low ferrous content, f) continuing to grind said waste material until said by-product of the waste material having said substantially low ferrous content has a particle size thereof reduced to below a predetermined particle size without substantially reducing said particle size of said primary material having said total ferrous content of substantially 90% by weight to below said predetermined particle size, g) classifying the ground waste material comprising said by-product and said primary material by particle size, and h) removing and collecting at least a portion of the ground waste material having at least said predetermined particle size.

20. A process for the beneficiation of kish slag waste material as recited in claim 19 wherein said waste material is ground until said by-product having said particle size below said predetermined particle size has a ferrous content of generally about less than 10% by weight.

* * * * *